Aug. 22, 1950     R. F. McDEVITT     2,519,489
SOUND PRODUCING TOY
Filed Jan. 24, 1947
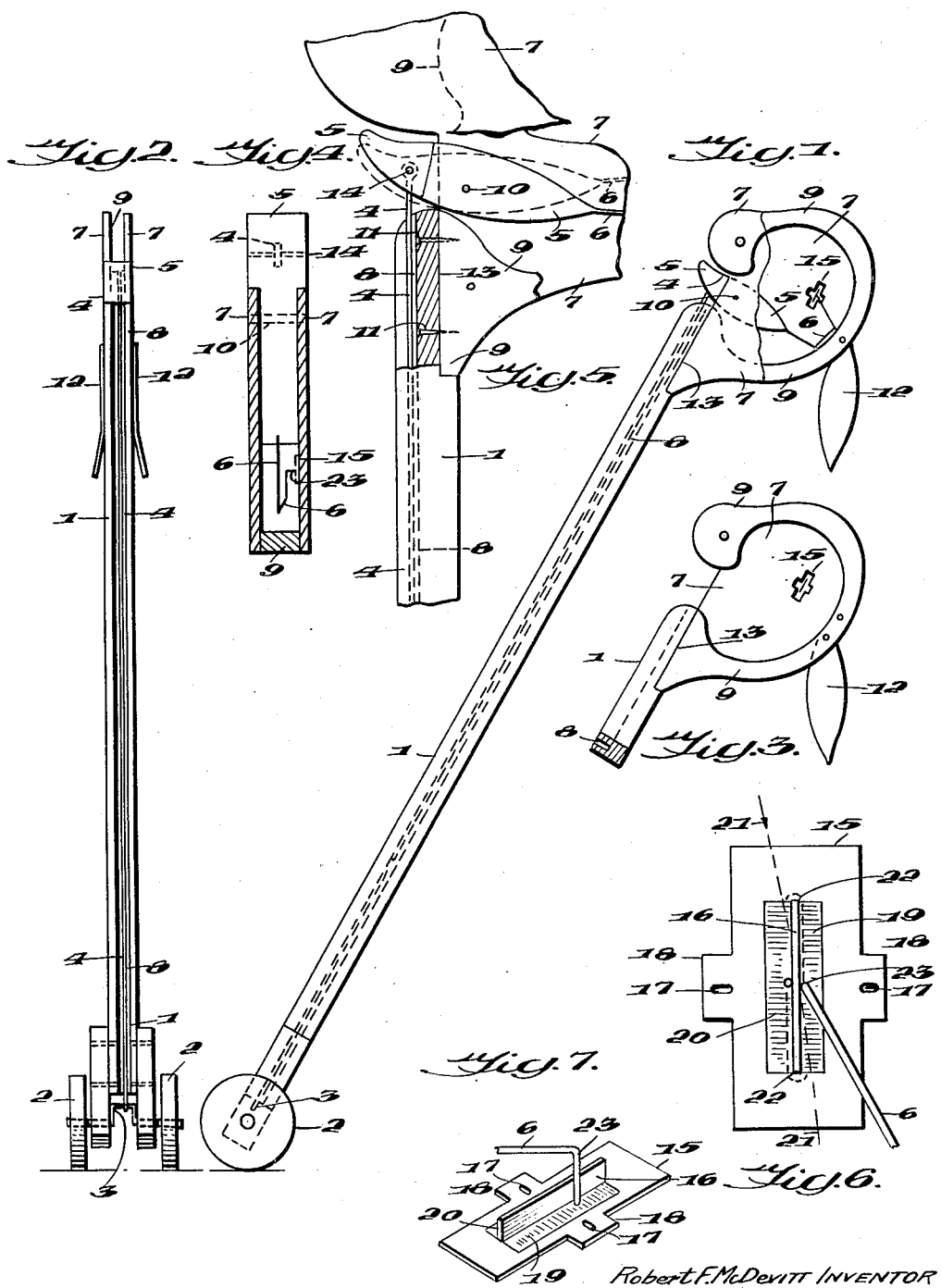
Robert F. McDevitt INVENTOR
By N. S. Amstutz
ATTORNEY Patented Aug. 22, 1950

2,519,489

UNITED STATES PATENT OFFICE 2,519,489

SOUND-PRODUCING TOY

Robert F. McDevitt, Gary, Ind.

Application January 24, 1947, Serial No. 724,046

4 Claims. (Cl. 46—98)

My invention relates to improvements in sound producing toys which in appearance may simulate a horse or other animal, and it more especially consists of the features described in the specification and pointed out in the accompanying claims.

The purpose of my invention is to provide a riding stick that is supported on a pair of wheels; that has a simulated head of an animal at the upper end of the stick; that uses the side walls of the animal's head as a sounding board; that utilizes a crank on the wheel shaft to actuate a long rod that passes through a hole or in a groove of the riding stick to actuate the lower jaw of a simulated animal; that makes use of the to and fro movement of the jaw member to reproduce sound producing record which is engaged by an elastic member which projects from the jaw; and that causes the sound transmitting elastic member to traverse a different path when it moves in one direction from that when it moves in the reverse direction.

With these and other related ends in view I illustrate in the accompanying drawing such instances of adaptation as will disclose the broad, underlying, features of the invention without limiting myself to the specific details shown thereon and described herein.

Fig. 1 is a side elevation of a complete wheeled stick toy.

Fig. 2 is a front end elevation of Fig. 1.

Fig. 3 is a detached elevation of the hollow center of the head associated with one stick.

Fig. 4 is a detached plan view of the jaw in its relation to the sides of the head.

Fig. 5 is an enlarged elevation of the attachment of the hollow center to the stick.

Fig. 6 is an enlarged plan of the sound unit.

Fig. 7 is a reduced size perspective of Fig. 6.

In practicing my invention I may use whatever changes or modifications of structure that the exigencies of varying conditions may demand without departing from the broad scope of the invention.

The structure of my device is very simple. It comprises a riding stick 1 which at its lower end has rolling wheels 2, the axle of the wheels secured thereto has a crank 3 formed on it. This is connected, in pivotable relation to a long rod 4 which passes through a lengthwise groove 8 in the stick 1.

At the upper end of the stick 1 there is a recess 13 against which the hollow section 9 is secured by screws. The hollow center 9 is supported between two side members 7 that are relatively thin. They are held by screws or any other desired means against the center and it is secured to the stick 1 by screws 11.

In the simulated horse's head covered by side member 7 there is pivoted at 10 the lower jaw 5. This is pivotably connected to the rod 4 by a cross pin 14. There are simulated ears 12 attached to each side of the head.

From the inner end of the jaw 5 there projects a spring 6 which has a lateral projection 23 that engages the sound producing member 15.

The sound track member 15 is a complete unit and it is attachable to the inner face of one of the sides 7.

The unitary sound track formed 15 of any desired plastic or other material has a fastening projection 18 at each side in which there is a slot 17. The slots permit of a side wise adjustment if found necessary and they avoid exact precision of location that would be required if the holes were not elongated. In the center of the member 15 there is a lengthwise upstanding barrier 16. On the right hand side of the barrier 16 there is a sound track 19 and on the left hand side of the barrier there is a sound-track 20. The reproducing end 23 of the spring 6 normally in the absence of any sound track or barrier would traverse the curved path 21. This is shown in Fig. 6.

The member 15 is placed at a slight angle to the normal path 21 which causes the reproducing end 23 to be put under side stress so that at the reversing point 22 of the barrier 16 the point 23 will swing to the left to be on the left hand side of the barrier ready for its return trip. When the bottom end 22 of the barrier 16 is reached the side tension on the part 23 will be toward the right and when the terminal 22 is passed it will swing to the right side of the barrier. Thus two different sound effects are produced to simulate any desired combination of sound.

In case it is desired to lengthen the sound tracks, the distance between the pivot 10 and the attachment of the rod 4 to the lower jaw may be shortened. The ratio of the distance of the point 23 to the pivot 10 and from the pivot 10 to the rod 4 may be changed as desired or as needed.

The riding stick with its attached wheels may have the record of any desired object produced at its upper end and the resulting sounds may be varied almost universally so as to imitate the natural sounds produced by different animals and the invention includes any desired form of replaceable sound record units.

What I claim is:

1. An audible sound-producing toy which comprises a relatively long stick, wheels at the lower end, a simulated animal head at the upper end, a lengthwise groove in the stick, a pivoted lower jaw in the head, a crank on the wheel axle, a rod in the groove connecting the crank to the jaw forward of the pivot point, a rearward extension of the jaw supporting a spring terminating in a sound-reproducing projection, an attachable sound recording unit secured to the inside of the animal head serving as a sounding board, and means for adjustably securing the sound track unit within the path of the reproducing needle.

2. An audible sound-producing toy which comprises a riding stick, wheels at the lower end, a cranked axle attached to the wheels, a simulated animal head at the upper end of the stick, a jaw pivoted to the simulated animal head, a connection between the jaw and the cranked axle, and the head having an open center, a relatively thin member on each face of the center, said members serving as sounding boards, a sound-reproducing unit adjustably secured to the inside of the members, and a spring attached to the jaw adapted to engage the sound record.

3. An audible sound-producing toy which comprises a riding stick, means at one end to simulate an animal head, rolling means at the other end, a movable member in the animal's head, a connection between the rolling wheels and the movable member, a sounding board structure comprising the simulated head, an attachable two-way sound track supported on the inside surface of the sounding board portion of the head, and resilient means for selectively engaging the sound track while said means are actuated by the movable member of the head.

4. An audible simulated animal's head which comprises an open center, a relatively thin member on each side of the center either one constituting a sounding board, a sound track unit secured to the inner face of one of the sides, a movable member pivoted to the simulated animal head, a resilient extension of the movable member adapted to engage the sound track, and means for actuating the movable member to produce resonating sounds.

ROBERT F. McDEVITT.

REFERENCES CITED

The following references are of record in the file of this patent:

UNITED STATES PATENTS

| Number | Name | Date |
|---|---|---|
| 1,701,734 | Stephens | Feb. 12, 1929 |
| 1,880,240 | Czeijar et al. | Oct. 4, 1932 |
| 2,281,757 | Fisher | May 5, 1942 |